Aug. 29, 1967 K. H. NORSWORTHY 3,339,063
STANDARD DEVIATION COMPUTER
Filed March 9, 1964
4 Sheets-Sheet 1

INVENTOR.
KEITH H. NORSWORTHY
BY
Reynolds & Christensen
ATTORNEYS

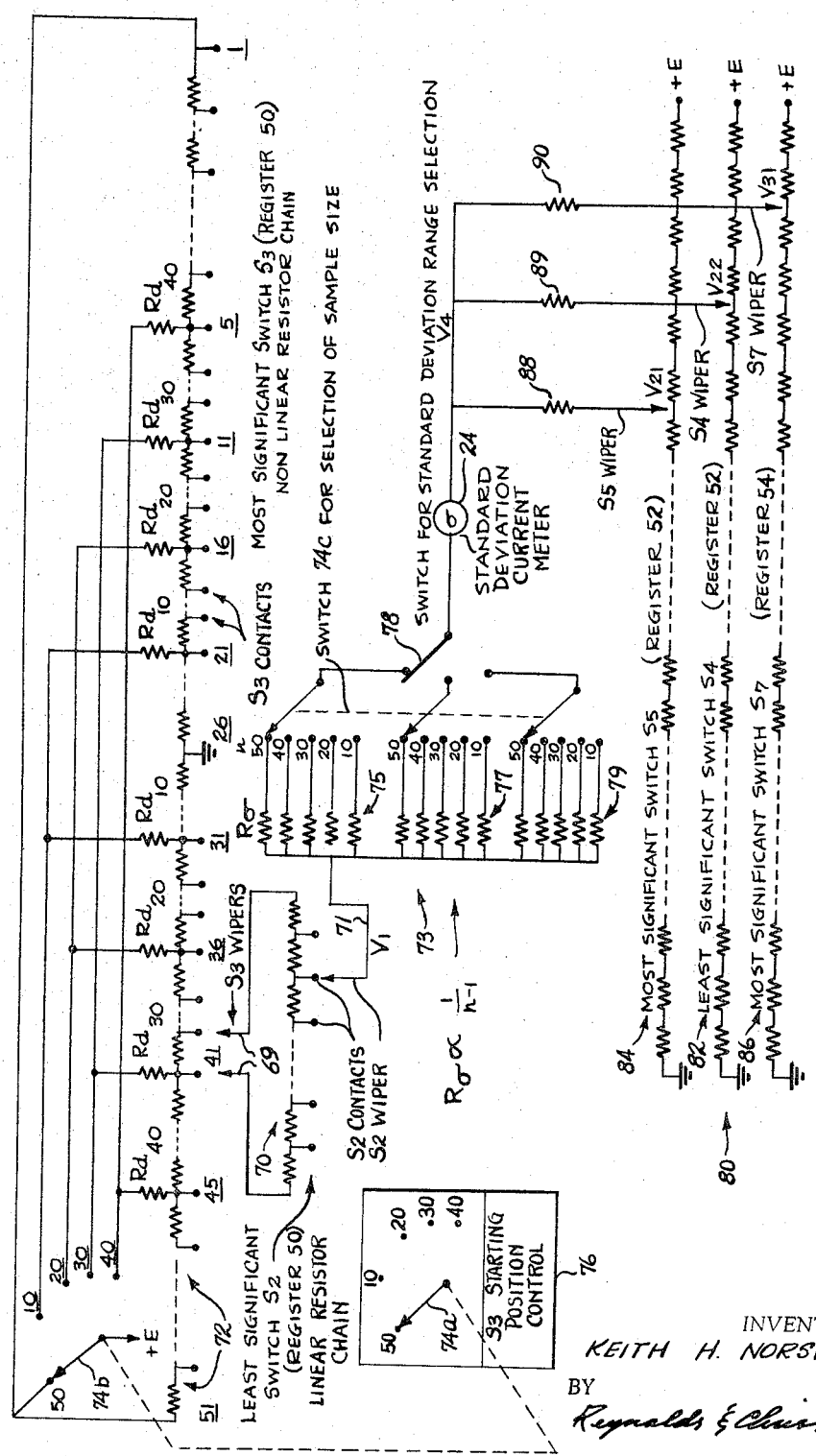

Aug. 29, 1967  K. H. NORSWORTHY  3,339,063
STANDARD DEVIATION COMPUTER

Filed March 9, 1964  4 Sheets-Sheet 4

INVENTOR.
KEITH H. NORSWORTHY
BY
Reynolds & Christensen
ATTORNEYS

United States Patent Office 3,339,063
Patented Aug. 29, 1967

3,339,063
STANDARD DEVIATION COMPUTER
Keith Harvey Norsworthy, Seattle, Wash., assignor to The Boeing Company, Seattle, Wash., a corporation of Delaware
Filed Mar. 9, 1964, Ser. No. 350,339
11 Claims. (Cl. 235—151.13)

This invention relates to computer techniques, and in particular to instruments for computing the standard deviation of a series of values representative of any various measurable test parameters, and for computing certain other quantities. The illustrated embodiment of the invention is an electronic or electromechanical computer for deriving the covariance or the standard deviation of a number of voltage values sequentially applied at its input, and at the same time deriving their mean deviation. Various novel features reside in the combination of elements and techniques employed in achieving these results in a relatively simple, accurate and fast acting instrument. While the invention is herein described in terms of a certain preferred form thereof, it will be recognized that various changes and modifications may be made without departing from the essential features involved.

Recent years have seen an increasing emphasis on statistical quality control, due partly to an increasing demand for a high degree of reliability on the part of the military, partly to decreases in mechanical tolerances in the design of high-speed aircraft and missiles, and partly to an increasing awareness among all industries of a need to produce highly reliable products in order to remain competitive. In most instances quality control efforts include use of statistical sampling techniques which require measurement of both standard deviation and mean deviation of a sample of items or tests.

A typical example of use of standard deviation measurement is in inspection of head protrusion values of production flush fasteners on aerodynamic surfaces. Flushness is more critical and closer design tolerances and more rigid inspection procedures are required for higher anticipated aircraft speeds and higher surface stress loads. According to a typical inspection procedure all of a sample of, say 50 fasteners on a surface are measured for head protrusion values based on the Hamilton Standard Lot Plot Method described in Industrial Quality Control, volume 7 (No. 1), pages 62–71 (July 1950). The inspection results are statistically analyzed and the lot is rejected if more than two percent thereof are above or below specification limits. Other examples of application of standard deviation techniques include measurement of the concentricity of O rings, smoothness of flat surfaces, component weight variations, and electronic component parameter variations.

This invention has as an object the provision of computer techniques and instruments which can be utilized to advantage in standard and mean deviation measurements, and in other types of measurements.

It is another object hereof to provide a simple and inexpensive instrument combining known elements in novel ways to achieve linear analog-to-digital conversion, summation of digital quantities, digital squaring, permanent memory, and linear and nonlinear digital-to-analog conversion. It is a further object to combine some or all of these techniques into simple instruments for specific computations of standard and mean deviation.

A further object hereof is to provide measurement systems wherein influence of measurement speed on instrument accuracy is eliminated.

Still another object is to provide an instrument conveniently adaptable for measuring samples consisting of different numbers of tests or items.

Another object is to provide an instrument utilizing readily available circuit and computer elements, thereby contributing to its low cost and simplicity of manufacture.

To achieve these and other objects appearing hereinafter, this invention provides an electrical standard deviation computer system comprising first and second accumulators for summing numbers applied sequentially thereto. Special control means apply to the first accumulator numbers representative of or linearly related to input signal values applied to the system, and apply to the second accumulator numbers representative of or related to the squares of the input signal value. Associated with the first accumulator is a nonlinear digital-to-analog converter for deriving from the linear summation therein an analog voltage related to the square of that summation. Associated with the second accumulator is a linear digital-to-analog converter which converts the summation therein to an analog voltage representative of that summation. Further, means are provided for comparing or deriving the difference between the respective converter output voltages, while applying a weighting factor thereto corresponding to the number of inputs applied to the system, thereby to derive the standard deviation of the sequentially applied input numbers. A separate linear digital-to-analog converter is optionally included for simultaneously deriving from the linear summation of values in the first accumulator an analog voltage representative of the average of values included in that summation.

The invention further resides in particular combinations of techniques utilized for computing squared values in the system. For example, the system derives an analog voltage proportional to the square of the sum of input values applied to the system. An accumulator having a plurality of individually selectable output connections sums the input values and expresses the sum in terms of predetermined ones of such output connections. A nonlinear converter associated with the accumulator comprises a square-law voltage divider having a variable output responsive to the predetermined accumulator output connections and adapted thereby to convert the summation therein to an analog voltage proportional to the square of the sum of the input values.

Further, the nonlienar converter includes means for deriving closer approximations of square-law output conversions, comprising a second voltage divider connected to the variable output of the first and adapted to interpolate between adjacent approximate square-law output values thereof. In its illustrated form from the accumulator comprises a higher order stepping switch having a plurality of contacts to which individual resistors comprising the first voltage divider are connected, and a lower order stepping switch, connected in number-carrying arrangement with the higher order switch, and having a plurality of contacts to which individual resistors comprising the second voltage divider are connected. The second voltage divider is thereby connectable between predetermined adjacent contacts of the first voltage divider and includes a variable output terminal, the voltage upon which comprises an interpolation between voltages on the adjacent first voltage divider contacts.

The system input comprises a device having a plurality of selectable electrical output connections and adapted to select predetermined sets of such connections in response to corresponding predetermined input values. A control device interposed in these electrical connections includes means for applying to the aforementioned two accumulators actuating pulses which are stored therein as numbers. The control device further includes means responsive to the predetermined sets of connections of said input device whereby to transmit predetermined numbers of such pulses to the accumulators according to the connections selected corresponding to the applied input values.

This combination of elements includes an arrangement for computing the sum of the squares of the applied input values. Specifically, the number of pulses applied to the second accumulator in response to each input value is related to the square of that value. The accumulator thus sums the squares of the input values, and the associated converter translates the summation to an analog voltage proportional to the sum of the squares of the applied input values.

In the preferred combination of the aforementioned techniques the invention comprises an electrical instrument for deriving the standard deviation of input signal values. The input value is applied to the above-described input device which selects predetermined corresponding internal connections. The instrument further comprises a first branch responsive to certain of those connections and including the first accumulator and associated converter for deriving an analog voltage related to the square of the sum of the input values. A second branch is responsive to certain other connections selected by the input device and includes the second accumulator and associated converter for deriving the sum of the squares of the input values. The instrument finally includes means for comparing the analog voltage outputs of the separate branches, including weighting means accounting for the number of input values applied, whereby to derive the standard deviation of said input values.

Other features, objects and advantages of the invention will be recognized from the following more detailed description taken in connection with the accompanying drawings, which illustrate the preferred form thereof.

FIGURE 3 is a circuit diagram illustrating the voltage dividers utilized in combination with stepping switches for digital-to-analog conversion to derive the standard deviation.

The arithmetic calculation of standard and mean deviation of statistically distributed tests can be performed by any of a number of general purpose digital computers in existence. The illustrated computer embodying the features of the invention is a special purpose instrument designed to compute the standard deviation and the mean or average deviation of a number of items or tests. The items or tests in the sample are converted to discrete analog voltages $V_n$ by means of a suitable transducer or other means (not shown) and are applied sequentially to the instrument input. After application of all the items (voltages), the standard and mean deviation are read on current meters or suitable recorders or the like at the output.

The well-known formula for the standard deviation $\sigma$ of a number $n$ of values (voltages) $V_n$ is:

$$\sigma = \left[\frac{1}{n-1}\sum_{1}^{n}(V_n - \overline{V})^2\right]^{1/2} \quad (1)$$

where $\overline{V}$ is the mean deviation given by the following formula:

$$\overline{V} = \frac{1}{n}\sum_{1}^{n}V_n \quad (2)$$

The illustrated instrument computes both the standard and mean deviation, computation of the former being more easily understood from the following combined form of the above two formulas:

$$\sigma = \left\{\frac{1}{n-1}\left[\sum_{1}^{n}V_n^2 - \frac{1}{n}\left(\sum_{1}^{n}V_n\right)^2\right]\right\}^{1/2} \quad (3)$$

Figure 1:
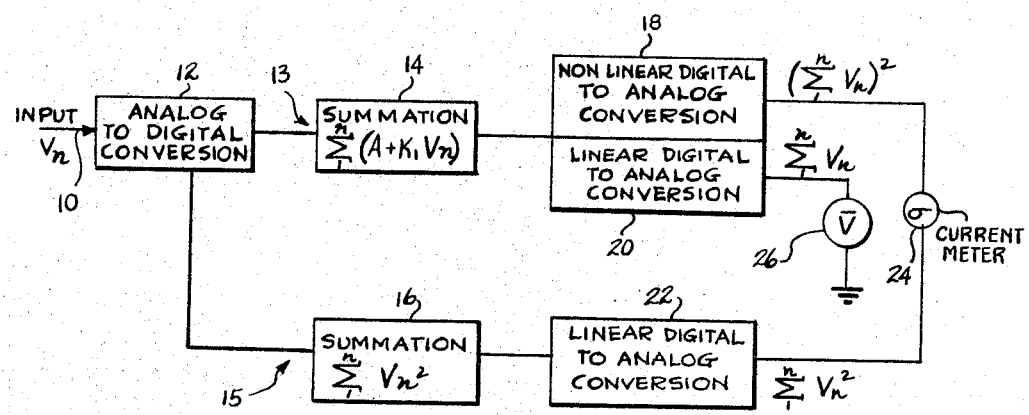
FIGURE 1 is a block diagram of a standard and mean deviation computer according to the invention.

The two terms within the brackets are computed in separate branches 13 and 15 of the instrument shown in FIGURE 1.

The input voltages $V_n$ are converted to digital numbers in the analog-to-digital converter 12. Converter 12 applies to a first accumulator 14 digital numbers which are linearly related to the input voltages $V_n$, and applies to a second accumulator 16 digital numbers related to the squared values of the input voltages $V_n$. Associated with accumulator 14 is a nonlinear digital-to-analog converter 18 which converts the linear summation of input voltages to an analog voltage representing the square of that summation, while accounting for the factor $1/n$ in Equation 3 as hereafter explained. Its output therefore represents the second term in brackets in that equation. Associated with accumulator 16 is a linear digital-to-analog converter 22 which converts the summation therein directly to an analog voltage. A current meter 24 is connected between the outputs of the nonlinear converter 18 and the linear converter 22 to indicate the difference between the output currents thereof, while factor $$\frac{1}{n-1}$$

in Equation 3 is accounted for as hereafter explained. The meter current is proportional to the covariance, or the standard deviation squared, so that the meter can be calibrated to read the standard deviation directly.

In addition, another linear digital-to-analog converter 20 is associated with accumulator 14, and its output current, measured by a second current meter 26, is proportional to the mean deviation $\overline{V}$ (Equation 2).

Figure 2:
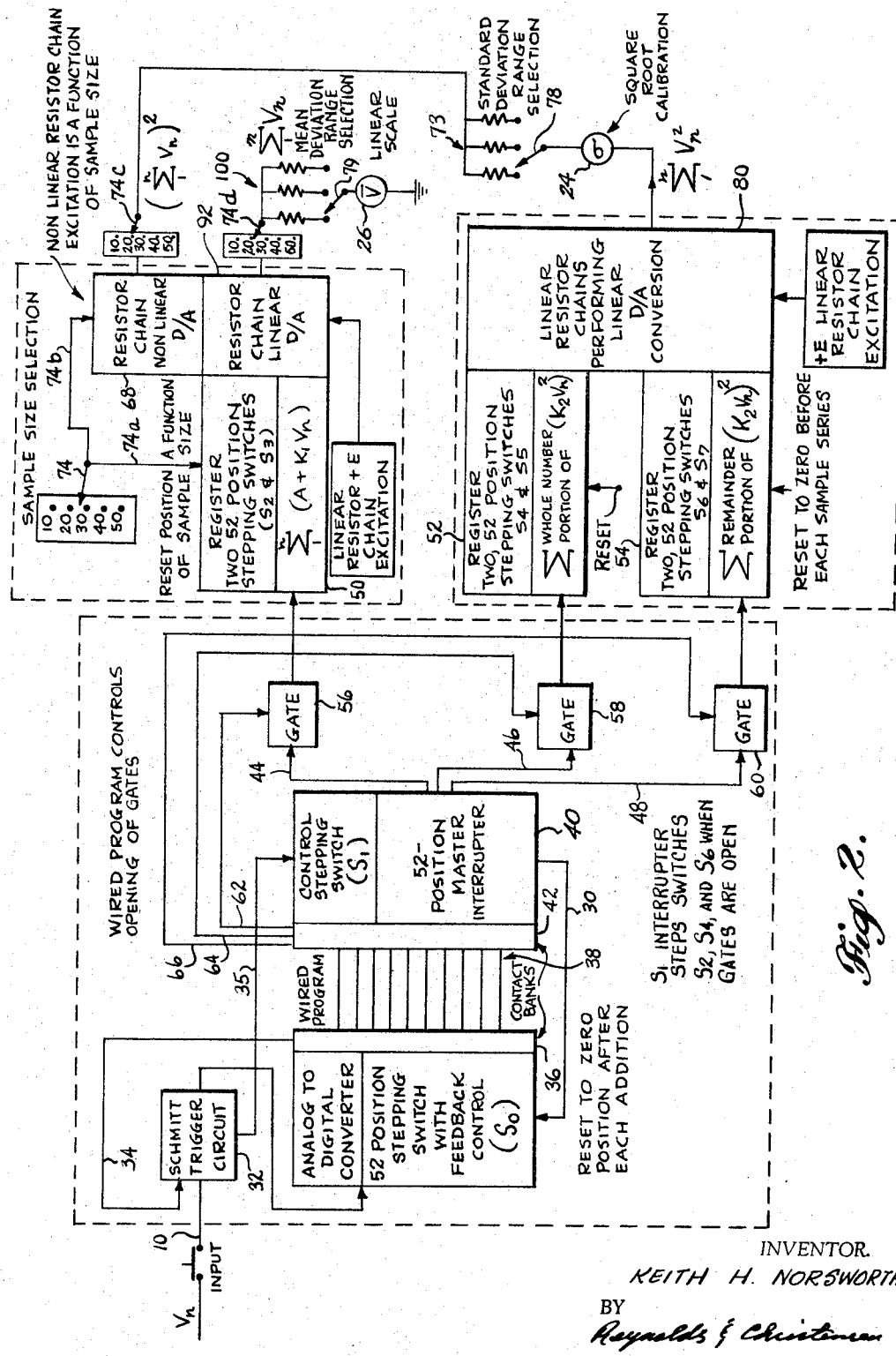
FIGURE 2 is a more detailed block diagram of the standard and mean deviation computer.

The analog-to-digital converter 12 (FIGURE 1) comprises the combination shown in FIGURE 2 of stepping switch $S_0$ and Schmitt trigger circuit 32 with feedback connection 34 therebetween. Stepping switch $S_0$ is preferably of a well-known type having 52 positions or contacts in each of a plurality of contact banks (with associated wipers) generally designated at 36. Schmitt circuit 32 causes the stepping switch to begin stepping with application of a voltage $V_n$ to input 10. As it advances through one revolution a feedback voltage is generated by suitable means (not shown) such as a linear voltage divider connected to one of the contact banks 36. This voltage is applied to the Schmitt trigger circuit 32, which is operable thereby to terminate stepping of switch $S_0$ after a predetermined number of steps corresponding to the input voltage value $V_n$. Thus the input voltage is "digitized" and represented by the stepping switch wiper position. The wiper position selects certain predetermined connections in a wired program 38 associated with its contact banks 36, as is more fully explained hereafter.

When input stepping switch $S_0$ finds its position representing input voltage $V_n$, the Schmitt trigger circuit energizes control stepping switch $S_1$ responsive thereto through connection 35. Stepping switch $S_1$ may be of any suitable type, but is preferably another 52-position stepping switch having a plurality of contact banks 42 and corresponding wipers (not shown). In response to the actuating trigger signal from the Schmitt circuit, this switch makes one complete revolution and stops, until retriggered after application of another input signal. During each such revolution the actuating unit or interrupter 40 thereof applies to output terminals 44, 46 and 48 fifty-two trigger pulses simultaneous with its stepping. These pulses are applied to three gate circuits 56, 58 and 60, comprising any suitable form of gate circuit, such as those utilizing silicon controlled rectifiers. The gates are operated by control signals from different connections in $S_1$ contact banks 42 through leads 62, 64 and 66. At the beginning of each test the gate circuits are closed. At predetermined times after control switch $S_1$ begins stepping, the gate circuits are opened to pass predetermined numbers of the interrupter output pulses during the remainder of the $S_1$ cycle. These pulses are added or accumulated in registers 50, 52 and 54 as will be explained.

The $S_1$ step at which each gate is opened is determined by connections in the wired program 38. These may be arranged in any of different ways recognizable by those skilled in the art according to the following discussion of the preferred technique. Wired program 38 consists preferably of electrical connections between contacts of different contact banks 36 of input stepping switch $S_0$ and contacts of different contact banks 42 of control stepping switch $S_1$. Current applied to each of the appropriate wipers of input stepping switch $S_0$ is transmitted through the particular connections selected by the stopping position. These connections are completed as control switch $S_1$ reaches predetermined positions, so that the $S_0$ wiper current is passed to the gate circuits 56, 58 and 60, triggering them open accordingly. For example, the timing of a signal in connection 62 to gate 56 is such that the number of interrupter pulses remaining in the $S_1$ cycle is linearly related to the input voltage $V_n$. This number of pulses is applied by gate circuit 56 to the register 50.

Register 50 corresponds to accumulator 14 in FIGURE 1, performing the linear summation indicated. It comprises two 52-position stepping switches $S_2$ and $S_3$, preferably of the same known type as those previously discussed, having a plurality of contact banks and associated wipers. The aforementioned interrupter pulses of control switch $S_1$ are applied to the interrupter of stepping switch $S_2$, whereby the latter follows the former when the connection therebetween is made by gate circuit 56. Switch $S_3$ is in turn responsive to $S_2$ whereby each revolution of $S_2$ causes $S_3$ to step once. This arrangement whereby one number is "carried" to the higher order stepping switch is well known, for example, in decade stepping switch apparatuses.

It can now be seen that upon application of an input voltage $V_n$, a number $N_1 = A + K_1 V_n$ will be stored in register 50, where $A$ and $K_1$ are proportionality constants determined by the particular arrangements employed. After each input voltage is applied and switch $S_1$ has passed through its cycle and applied the appropriate number of pulses to the respective registers, input stepping switch $S_0$ is reset by a reset pulse through connection 30 from control switch $S_1$, whereupon it is conditioned for application of the next input voltage. The register stepping switches $S_2$ and $S_3$, however, are not cleared, but are stepped further by application of subsequent inputs. These switches are reset, of course, before each input series comprising a new sample. The reset position of higher order switch $S_3$ is a function of the number of input voltages to be included in the sample, as will be explained shortly, while the reset position of the remaining switches in the system is not changed.

After a number $n$ of tests the positions of switches $S_2$ and $S_3$ represent the summation $$\sum_{1}^{n}(A+K_1V_n)$$

This digital summation is converted to an analog voltage proportional to $$\left(\sum_{1}^{n}V_n\right)^2$$

by means of a nonlinear digital-to-analog converter 68 comprising the resistor chain or voltage divider arrangement shown in FIGURE 3. Resistor chain 72 comprises individual series connected resistors connected between adjacent contacts (positions numbered 1 to 51) of stepping switch $S_3$. The center terminal (position 26) of the resistor chain is grounded, and end-terminal voltages are established by connection to a positive excitation voltage $+E$ by selector switch 74b.

A second resistor chain 70 comprises individual series connected resistors connected between adjacent contacts of lower order stepping switch $S_2$. Its end terminals are connected between adjacent wipers 69 of higher order stepping switch $S_3$. Wiper 71 of switch $S_2$ therefore derives a voltage $V_1$ from the lower order voltage divider 70, which interpolates between adjacent contact voltage values of the higher order voltage divider 72.

Figure 4:
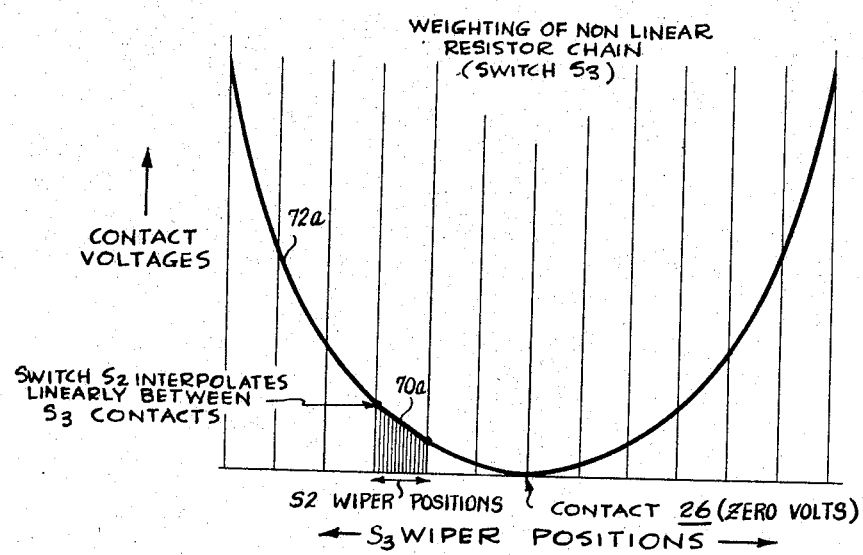
FIGURE 4 is a diagram of the voltage values appearing on the contacts of the nonlinear voltage divider of FIGURE 3.

Resistor values of higher order voltage divider 72 are weighted according to a square-law formula so that the $S_3$ contact voltages fall on a parabola 72a as shown in FIGURE 4 when plotted against $S_3$ wiper positions. The lower order resistors of resistor chain 70 are equal in the instant case, whereby lower order switch $S_2$ linearly interpolates at 70a between adjacent values on the parabola. Other mathematical forms of interpolation are of course possible. Thus it is seen that the $S_2$ wiper output voltage $V_1$ represents a close approximation of the square of the number represented by the positions of switches $S_2$ and $S_3$, thereby converting that number to the desired analog voltage proportional to $$\left(\sum_{1}^{n}V_n\right)^2$$

a portion of the second term in brackets in Equation 3.

As can be seen from the equation, the standard deviation is a function of the number $n$ of input voltages contained in the sample. The factor $1/n$ is accounted for in the starting position of stepping switch $S_3$ and in the voltage applied to the end terminals thereof, as will now be explained. Selector switch 74a is connected to the stepping switch $S_3$ stepping and reset apparatus (not shown) which includes starting position control means 76 (FIGURE 3). This control apparatus renders the starting position of switch $S_3$ selectable according to a sample size of 10, 20, 30, 40 or 50 tests or items.

For a 50-test sample all contacts of switch $S_3$ are utilized; the starting position is contact 1 and the voltage applied to the end terminals (contacts 1 and 51) of voltage divider 72 is $+E$ volts. For a 40-test sample the starting position is contact 5 and maximum stopping position is contact 45. At the same time selection switch 74b applies the excitation voltage at these contacts through pairs of dropping resistor $Rd_{40}$ which establish the proper parabola contact voltages along the voltage divider. Appropriate starting positions and excitation voltages are also provided as shown for sample sizes of 10, 20 and 30 tests.

In addition to the above adjustments for different sample sizes, the factor $$\frac{1}{n-1}$$

in Equation 3 is accounted for by the different values of resistance $R\sigma$ selectable from network 73 by means of selection switch 74c, which thereby interposes the appropriate resistance in the connection to the standard deviation current meter 24. A three-way meter range selection switch 78 is also provided for selection of the appropriate resistor value from one of resistor networks 75, 77 or 79.

The summation of numbers representing squares of individual input voltages, i.e. the first term in brackets in Equation 3, is performed by accumulator 16 (FIGURE 1), which comprises two registers 52 and 54 (FIGURE 2). Register 52 comprises two 52-position stepping switches $S_4$ and $S_5$ (not shown). Switch $S_4$ is the lower order stepping switch and "follows" control stepping switch $S_0$ in response to application of interrupter pulses thereof through gate circuit 58. Upon each revolution thereof switch $S_4$ "carries" a number of stepping switch $S_5$ by causing it to step one position, according to the known carrying principle. In like manner, register 54 comprises two 52-position stepping switches $S_6$ and $S_7$, which are lower and higher order stepping switches, respectively, having the same carrying arrangement as the switches of registers 50 and 52. Switch $S_6$ follows control stepping switch $S_1$ in response to interrupter pulses applied through gate circuit 60.

It will be recalled that predetermined numbers of output pulses from interrupter 40 of the control stepping switch are applied to the respective registers according to the stopping position of input stepping switch $S_0$, which is determined by the magnitude of the input voltage. Connections in wired program 38 are such that gate circuits 58 and 60 are opened to transmit to registers 52 and 54 numbers of interrupter pulses $N_2$ and $N_3$, respectively, given by the following formulas:

$$N_2 = W(K_2V_n)^2 \qquad (4)$$

$$N_3 = W[52 \times R(K_2V_n)^2] \qquad (5)$$

where W means "whole number portion of," R means "remainder portion of," and $K_2$ is a constant of proportionality related to the number of positions of the stepping switch. The number $N_2$ is an approximation of the sum of the squares of the input voltages $V_n$, represented in the present arrangement by the positions of both switches $S_4$ and $S_5$. Under certain circumstances this whole number approximation might be sufficiently accurate for a meaningful answer, but it is preferred to provide at least one additional register for computing the remainder portion of the sum of the squares. Therefore, register 54 is arranged to accumulate the number $N_3$, so that the summation of the squares of the input voltages $V_n$ is actually represented by the positions of the four stepping switches in registers 52 and 54. In this dual register arrangement fewer stepping switches and therefore less equipment are required than in the well-known decade stepping switch arrangement, and the summation can be performed in less time with equal or greater accuracy.

The stepping switch positions are converted to the required analog voltage by the linear digital-to-analog converter 80 comprising voltage dividers 82 and 84 associated with switches $S_4$ and $S_5$ and voltage divider 86 associated with switch $S_7$. Each is excited by a positive voltage +E. An additional voltage divider (not shown) may optionally be provided with stepping switch $S_6$ when the accuracy in the remainder of the instrument justifies the additional accuracy which would be provided thereby. These voltage dividers comprise series connected resistors connected between adjacent contacts (not shown) of the respective stepping switches, and the associated wipers, which are electrically connected in a resistor summing network consisting of resistors 88, 89 and 90. These latter resistors are appropriately weighted to add the higher and lower order voltages $V_{21}$ and $V_{22}$ of register 52 and the higher order voltage $V_{31}$ of register 54, and the resulting summing junction voltage $V_4$ is applied to the current meter 24.

The current through the standard deviation current meter 24 is proportional to the square of the standard deviation $(\sigma^2)$, i.e. the covariance, but the meter is preferably calibrated having a square root scale so that standard deviation can be read directly.

Figure 5:
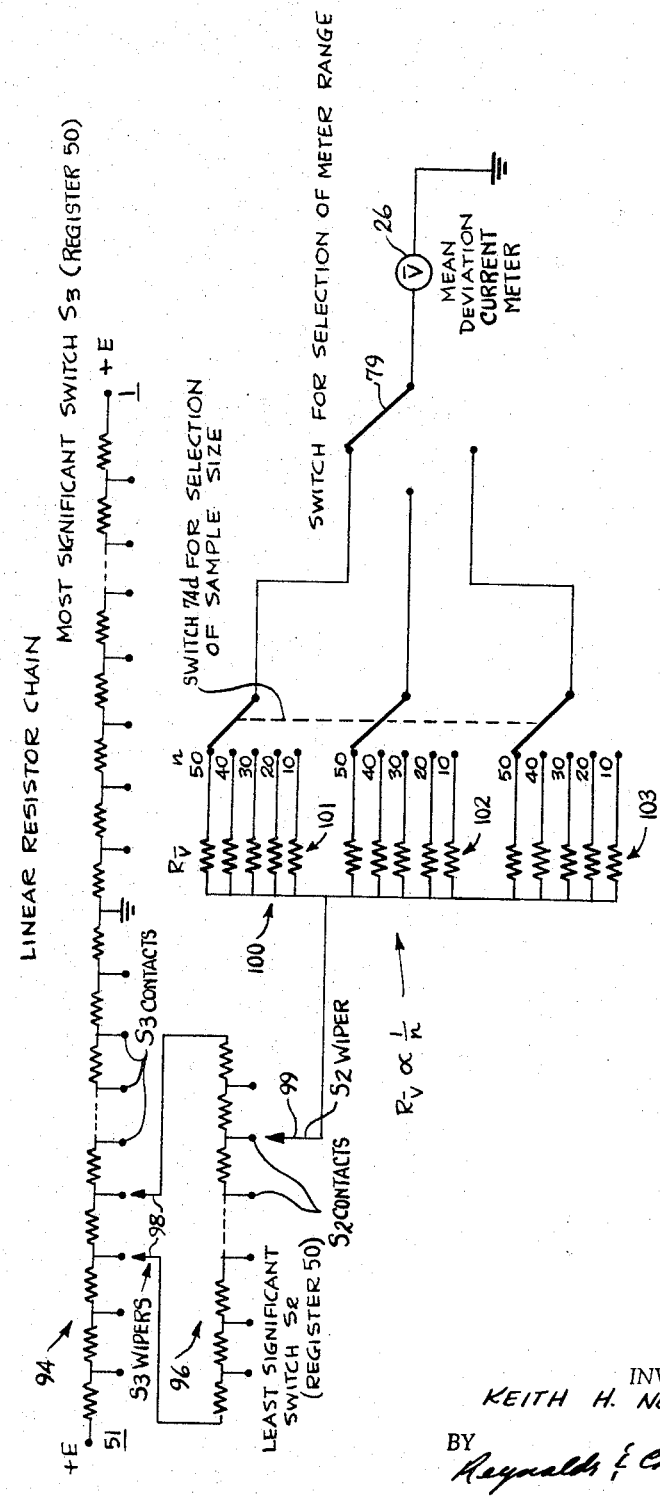
FIGURE 5 illustrates the voltage divider technique utilized to derive the mean deviation.

The fact that the linear summation $$\sum_{1}^{n}(A+K_1V_n)$$

is present in register 50 makes it convenient to derive the mean deviation $\overline{V}$ simultaneously with derivation of standard deviation. For this purpose the instrument includes the digital-to-analog converter 92 associated with stepping switches $S_2$ and $S_3$ of register 50 as shown in FIGURE 5. This converter comprises a first linear resistor chain 94 comprising series connected resistors connected between adjacent contacts of another of the contact banks of stepping switch $S_3$. A second linear resistor chain 96 is similarly connected to another of the contact banks of stepping switch $S_2$ as shown and derives its end terminal voltages from adjacent wipers 98 of stepping switch $S_3$. In this arrangement the lower order voltage divider (resistor chain 96 and $S_2$ wiper 99) interpolates between voltage values taken from adjacent terminals of the higher order resistor chain 94 by $S_3$ wipers 98.

The interpolated voltage on the $S_2$ wiper 99 is applied to the grounded mean deviation current meter 26 through a resistor $R_{\overline{V}}$ selected from resistor network 100. This network comprises three subnetworks 101, 102 and 103 selectable by means of meter range selection switch 79. The value of each resistor $R_{\overline{V}}$ accounts for the factor $1/n$ in Equation 2, where $n$ is the sample size selected by means of selector switch 74d. Therefore, the current in grounded meter 26 is proportional to the mean deviation $\overline{V}$ as given by Equation 2, and this measurement is conveniently made simultaneously with measurement of standard deviation $\sigma$.

Thus an instrument is provided which possesses various features not heretofore found in the art, and certain advantages in terms of simplicity and low cost of equipment, speed and convenience of computation, and immediate and simultaneously available standard and mean deviation answers in response to direct on-the-job application of test measurements. Other advantages and various modifications coming within the scope of the invention will be recognized by those skilled in the art.

What is claimed is:

1. An electrical system for deriving the difference between the square of the sum of a plurality of input voltages applied sequentially to the system and the sum of the squares of these voltages, comprising input means for converting said voltages individually into digital input numbers, first and second accumulators for summing digital numbers applied thereto, control means responsive to said input means for applying digital numbers to said accumulators, said control means including first gate means for applying to the first accumulator numbers linearly related to said digital input numbers and second gate means for applying to the second accumulator numbers related to the squares of said digital input numbers, nonlinear digital-to-analog converter means for translating the summation in said first accumulator into an analog voltage related to the square of said summation, a second digital-to-analog converter means for translating the summation in said second accumulator into an analog voltage related to the sum of said squares, and circuit means responsive to said accumulator for deriving the difference between the analog output voltages thereof.

2. An electrical system for deriving the covariance $\sigma^2$ of a plurality of $n$ input voltages $V_n$ applied sequentially to the system, according to the equation $$\sigma^2 = \frac{1}{n-1}\left[\sum_{1}^{n}V_n^2 - \frac{1}{n}\left(\sum_{1}^{n}V_n\right)^2\right]$$

comprising input means for converting said voltages individually into digital input numbers, first and second accumulators for summing digital numbers applied thereto, control means responsive to said input means for applying digital numbers to said accumulators, said control means including first gate means for applying to the first accumulator numbers linearly related to said digital input numbers and second gate means for applying to the second accumulator numbers related to the squares of said digital input numbers, nonlinear digital-to-analog converter means for translating the summation in said first accumulator into an analog voltage related to the square of said summation and to the number $n$ in said plurality and corresponding to the term $$\frac{1}{n}\left(\sum_{1}^{n}V_n\right)^2$$

in said equation, a second digital-to-analog converter means for translating the summation in said second accumulator into an analog voltage related to the sum of said squares and corresponding to the term $$\sum_1^n V_n^2$$

in said equation, and circuit means responsive to said accumulators for deriving the difference between the analog output voltages thereof, said circuit means including weighting means operable to weight said difference in proportion to the term $$\frac{1}{n-1}$$

in said equation.

3. The system defined in claim 2 wherein said circuit means further includes indicator means calibrated to indicate the square root of said difference, thereby to derive the standard deviation $\sigma$ of said plurality of input voltages.

4. The system defined in claim 3 wherein said input means comprises a stepping switch, a control circuit for said stepping switch, means in said control circuit operable to step said switch in response to an input voltage applied to the system, a feedback connection between said switch and said control circuit, means interposed in said feedback connection for generating a feedback voltage increasing with stepping of said switch, and means in said control circuit for terminating stepping of said switch in a predetermined position corresponding to the input voltage value in response to a predetermined feedback voltage level.

5. The system defined in claim 3 which further includes means for deriving the mean deviation $\overline{V}$ of said plurality $n$ of output voltages $V_n$ according to the equation $$\overline{V} = \frac{1}{n}\sum_1^n V_n$$

said means comprising linear digital-to-analog converter means operatively associated with said first accumulator for translating the summation therein into an analog voltage corresponding to the term $$\sum_1^n V_n$$

in said equation, means attenuating said analog voltage in proportion to the factor $1/n$, and mean deviation indicator means responsive to the attenuated analog voltage.

6. An electrical system for deriving the standard deviation of a series of input voltages applied sequentially to the system, comprising an analog-to-digital converter to which the input voltages are applied pulse generator means responsive to said converter, first and second accumulators responsive to said generator means for summing numbers of pulses applied thereto, first and second gate means interposed between said generator means and said first and second accumulators, respectively, gate control means responsive to said converter and operable in response to application of each input voltage to render said first gate means conductive for a period sufficient to transmit to the first accumulator a number of pulses linearly related to said input voltage and to render said second gate means conductive for a period sufficient to transmit to said second accumulator a number of pulses related to the square of said input voltage, a nonlinear digital-to-analog converter associated with said first accumulator and operable to convert the summation therein to an analog voltage proportional to the square of the sum of the applied input voltages, a linear digital-to-analog converter associated with the second accumulator and operable to convert the summation therein to an analog voltage proportional to the sum of the squares of the applied input voltages, circuit means connecting the outputs of said digital-to-analog converters, including means operable to weight the output responses therein relative to one another whereby current in said circuit means is proportional to the square of the standard deviation of said input voltages, and an indicator in said circuit means calibrated to indicate said standard deviation.

7. The system defined in claim 6 which further includes means for deriving the mean deviation of said series of input voltages, said means comprising a linear digital-to-analog converter associated with said first accumulator and operable to convert the summation therein to an analog voltage proportional to said mean deviation, and a mean deviation indicator responsive to said converter.

8. The system defined in claim 6 wherein said first accumulator comprises a stepping switch having a plurality of contacts and at least one wiper engaging said contacts sequentially in response to pulses from said generator means, whereby the wiper contact position represents the number of pulses applied to said accumulator, and wherein said nonlinear converter comprises a voltage divider network consisting of said wiper and a plurality of series connected resistors connected between said contacts and energizable to generate voltages thereon, said resistors having values establishing relative contact voltages whereby the wiper voltage varies according to a square law as said wiper is advanced in response to said pulses.

9. The system defined in claim 8 wherein said accumulator includes a second stepping switch also having a plurality of contacts and a wiper sequentially engaging the same in response to said generator pulses, said second stepping switch being operatively connected to the first stepping switch whereby one revolution of the second switch steps the first switch one step, said first stepping switch having a pair of wipers engaging adjacent contacts thereof, and wherein said nonlinear converter further includes a second voltage divider network consisting of the second stepping switch wiper and a plurality of series connected resistors connected between said second stepping switch contacts, said second voltage divider having its end terminals connected to said first stepping switch wipers, whereby the wiper voltage of said second stepping switch wiper comprises an interpolation between the voltages of adjacent first stepping switch contacts engaged by said first stepping switch wipers 10. The system defined in claim 6 wherein said second gate means comprises first and second gate circuits and said second accumulator comprises first and second registers to which said gate circuits are respectively connected to transmit said generator pulses thereto, said gate control means including first connection means operable to render the first gate circuit conductive for a period sufficient to transmit to said first register a number of generator pulses proportional to the whole number portion of the square of said input voltage and second connection means operable to render said second gate circuit conductive for a period sufficient to transmit to said second register a number of generator pulses proportional to the remainder portion of the square of said input voltage.

11. The system defined in claim 10 wherein said linear digital-to-analog converter comprises linear voltage divider networks associated with said first and second registers, said voltage dividers having respective pluralities of selectable output terminals, said registers including output terminal connecting means operable in accordance with numbers stored therein to select voltage divider output voltages corresponding to said numbers, and circuit means for summing the separate voltage divider output voltages to derive said analog voltage proportional to the sum of the squares of the applied input voltages.

References Cited

UNITED STATES PATENTS 3,082,949    3/1963    Barker  ---------- 235—151
3,124,745    3/1964    Schroeder  -------- 235—183

MALCOLM A. MORRISON, *Primary Examiner.*

M. P. HARTMAN, *Assistant Examiner.*